J. J. PIPPEN.
SAW GAGE.
APPLICATION FILED OCT. 5, 1910.
1,003,292.
Patented Sept. 12, 1911.
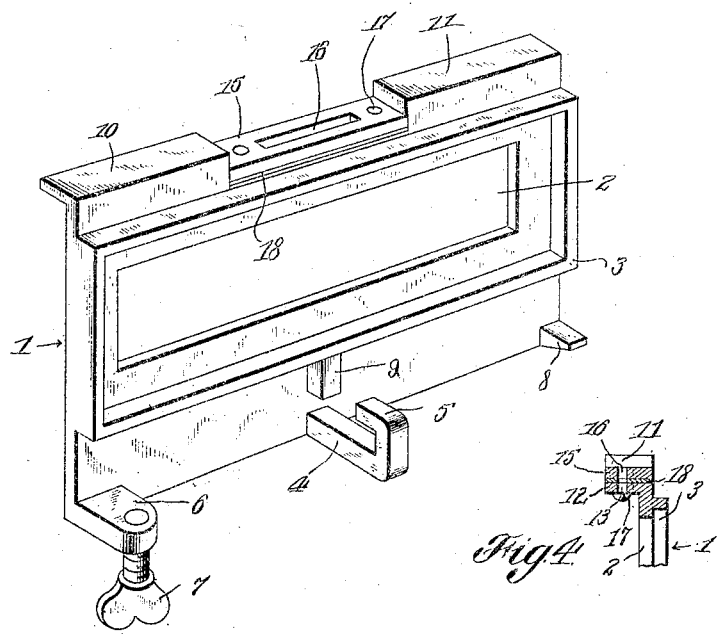
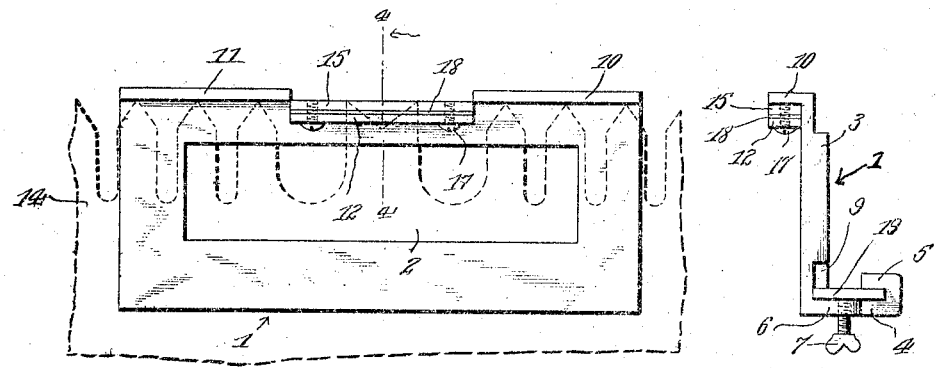
WITNESSES
J. H. Crawford
F. T. Chapman
INVENTOR
J. J. Pippen,
Attorney

UNITED STATES PATENT OFFICE.

JOHN J. PIPPEN, OF McLAURIN, MISSISSIPPI.

SAW-GAGE.

1,003,292.  Specification of Letters Patent. Patented Sept. 12, 1911.

Application filed October 5, 1910. Serial No. 585,407.

*To all whom it may concern:*

Be it known that I, JOHN J. PIPPEN, a citizen of the United States, residing at McLaurin, in the county of Forest and State of Mississippi, have invented a new and useful Saw-Gage, of which the following is a specification.

This invention has reference to improvements in saw gages, especially for crosscut saws, and its object is to provide a gage with means for jointing saw teeth and with means for governing the length of drag teeth.

In accordance with the present invention, there is provided a suitable frame of light but strong construction with means for holding a file in proper position for jointing the saw teeth and at the other edge of the frame from that at which the file holding devices are located, and on the other side of the frame, there is provided a stop adapted to engage the cutting teeth, while there is provided an adjustable depth device through which the drag teeth may pass, and by which the length of the drag teeth may be determined by means of the file.

The invention will be best understood from a consideration of the following detailed description taken in connection with the accompanying drawings forming a part of this specification, with the understanding, however, that the invention is not limited to the exact construction shown, but that such construction may be varied within the scope of the appended claims.

In the drawings, Figure 1 is a perspective view of the saw gage with the file omitted. Fig. 2 is an elevation of the saw gage from the side remote from that viewed in Fig. 1 and showing a saw in dotted lines. Fig. 3 is an end view of the saw gage. Fig. 4 is a section on the line 4—4 of Fig. 2, showing a file in place.

Referring to the drawings, there is shown a frame 1 of general rectangular shape, having there through an opening 2, and formed on one face of the frame 1 about the opening 2 is a flange 3 also of rectangular shape.

Offset from one edge of the frame 1, about midway of its length is a bracket 4, having one end 5 returned on the body of the bracket in overhanging relation thereto. At one end of the same edge of the body portion and offset from the same face is another bracket 6, having a plane face and at the end provided with a perforation tapped for the reception of a thumb screw 7. Offset from the same face and edge of the body portion, but at the end remote from the bracket 6 is a stud 8. The like faces of the brackets 4 and 6 and the stud 8 are all in the same plane. Formed on the same face of the body portion as the bracket 4, and extending from the flange 3 to a point adjacent to the bracket 4 is a boss 9, with the end toward the bracket 4 spaced therefrom.

Formed on the edge of the frame 1 remote from the brackets 4 and 6 and stud 8 and projecting from the other face of the body portion, are two flanges 10 and 11, in line one with the other and separated one from the other. Formed on the same face of the body portion 1 as the flanges 10 and 11, is another flange 12, nearer the opening 2 than are the flanges 10 and 11, and of a length approximately that of the space between the facing ends of the flanges 10 and 11. This flange 12 is provided with a central passage 13 of a length and width to receive a drag tooth of the saw, the latter being indicated in dotted lines at 14 in Fig. 2. The flange 12 receives a plate 15 of like size and shape to the flange, except that it may be as wide as the width of the flange and the thickness of the adjacent portion of the body 1, where the flange and body portion merge one into the other. The plate 15 has a central passage 16 matching the passage 13 of the flange 12. The plate 15 is held to the flange 12 by screws 17 on opposite sides of the matching passages 13 and 16, these screws entering tapped holes in the plate 15. In order to regulate the distance of the outer face of the plate 15 with reference to the under surfaces of the flanges 10 and 11, one or more shims 18 may be introduced between the plate 15 and the flange 12, these shims being made of paper, or metal, or wood, or any other suitable material.

The brackets 4 and 6 and the stud 8 are designed to receive a file 19 which may be clamped in place by the thumb screw 7 and the several parts holding the file are so proportioned that when the file is clamped in place, its active surface is at right angles to the plane of the outer edges of the frame-like flange 3.

The flange 3 serves to greatly strengthen the entire device and permits of body 1 being made quite thin, while the weight of the device is much lessened by the omission of material in the formation of the opening 2 without any sacrifice of needed strength.

With the file 19 in place, the saw teeth are readily jointed in the usual manner, the blade of the saw being guided by the flange 3, while the teeth are moved into engagement with the file 19.

The plate 15 is secured to the flange 12 by the screws 17 with an appropriate number of shims interposed to bring the exposed face of the plate 15 at the desired distance from the plane of the faces of the flanges 10 and 11 to be engaged by the cutting teeth of the saw, while a drag tooth will then enter the openings 13 and 16, and by the application of a file to the exposed face of the plate 15, these teeth may be properly gaged.

The action of a saw is due to the relation of the teeth one to another with respect to their lengths rather than to having them all of the same size. Furthermore, in practice a gage must be so constructed that it will hold its adjustment under all circumstances, no matter how roughly used the gage may be, and which will not get out of adjustment should the gage be subjected to shocks and jars such as might occur should the gage fall.

What is claimed is

1. A saw gage comprising a frame of flat form having on one side an outstanding flange of generally rectangular shape, the frame having at one edge outstanding from the same face as the flange spaced file supports, there being two file supports each at a respective end of the frame, and one of said end supports carrying a clamp screw and there being an intermediate file support having a return portion at the outer end directed toward the frame to grip the file.

2. A saw gage having a plurality of spaced file supports, one of which constitutes an intermediate support and is provided with a return portion in position to engage and grip a file, and another of which is an end support and is provided with a clamp screw coacting with the other supports to secure the file in place.

3. A saw gage having a body member with a flange outstanding from one face, an intermediately located bracket outstanding from the same face of the body member as the flange and located near one edge of the body member, said bracket having the outer end returned toward the body member in spaced relation to the main portion of the bracket, another bracket outstanding from the same face and edge of the body member as the first named bracket and located near one end of the body member, said last named bracket carrying a clamp screw, a stud outstanding from the same edge and face of the body member as the two brackets and located at the end of the body member remote from the second named bracket, and a boss on the body member in spaced relation to the first named bracket and coacting with the return portion of the first named bracket to engage a file.

In testimony, that I claim the foregoing as my own, I have hereto affixed my signature in the presence of two witnesses.

JOHN J. PIPPEN.

Witnesses:
S. E. DUNLOP,
M. GILLIS.